Nov. 27, 1934.   R. B. HICKS   1,982,430
FLOW SWITH
Filed July 12, 1933   2 Sheets-Sheet 1

INVENTOR
Robert Bruce Hicks
BY
ATTORNEYS

Nov. 27, 1934.   R. B. HICKS   1,982,430
FLOW SWITCH
Filed July 12, 1933   2 Sheets-Sheet 2

INVENTOR
Robert Bruce Hicks
BY
ATTORNEYS

Patented Nov. 27, 1934

1,982,430

UNITED STATES PATENT OFFICE 1,982,430

FLOW SWITCH

Robert Bruce Hicks, Brooklyn, N. Y.

Application July 12, 1933, Serial No. 680,016

13 Claims. (Cl. 200—81)

This invention relates more particularly to a device for operating an electric switch or other control device in response to fluid pressure variations in a conduit.

Important objects of the invention are, to provide a device of said character embodying improved features of design to provide a more simple and satisfactory automatic means to accelerate the flow through a delivery conduit when a utility outlet is opened and to provide an improved apparatus responsive to fluid pressure in a delivery conduit to set a normally idle pump in operation automatically when a utility outlet is opened, to accelerate the flow to the outlet, and responsive also to fluid pressure in the conduit to stop the pump automatically when the utility outlet is closed.

Other objects of the invention will appear hereinafter.

Figure 1:
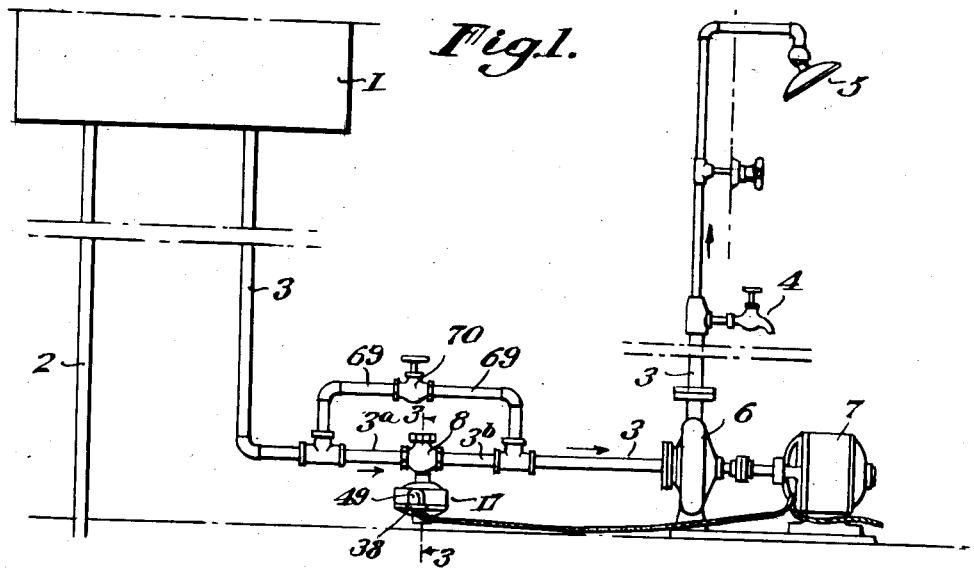
Figure 2:
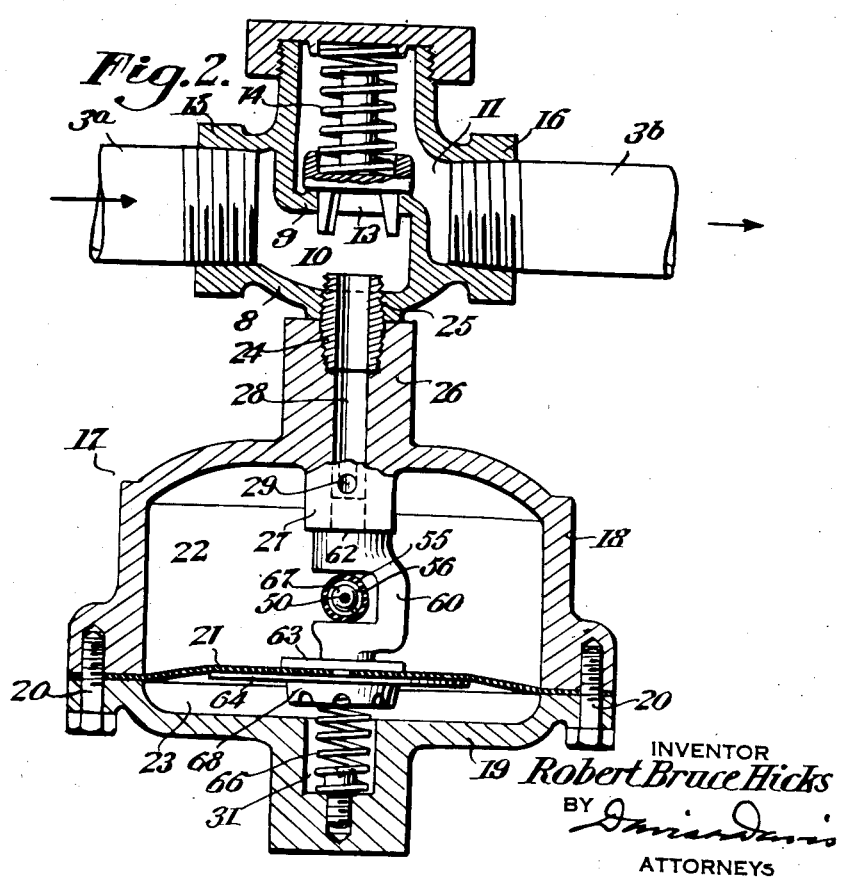
Figure 3:
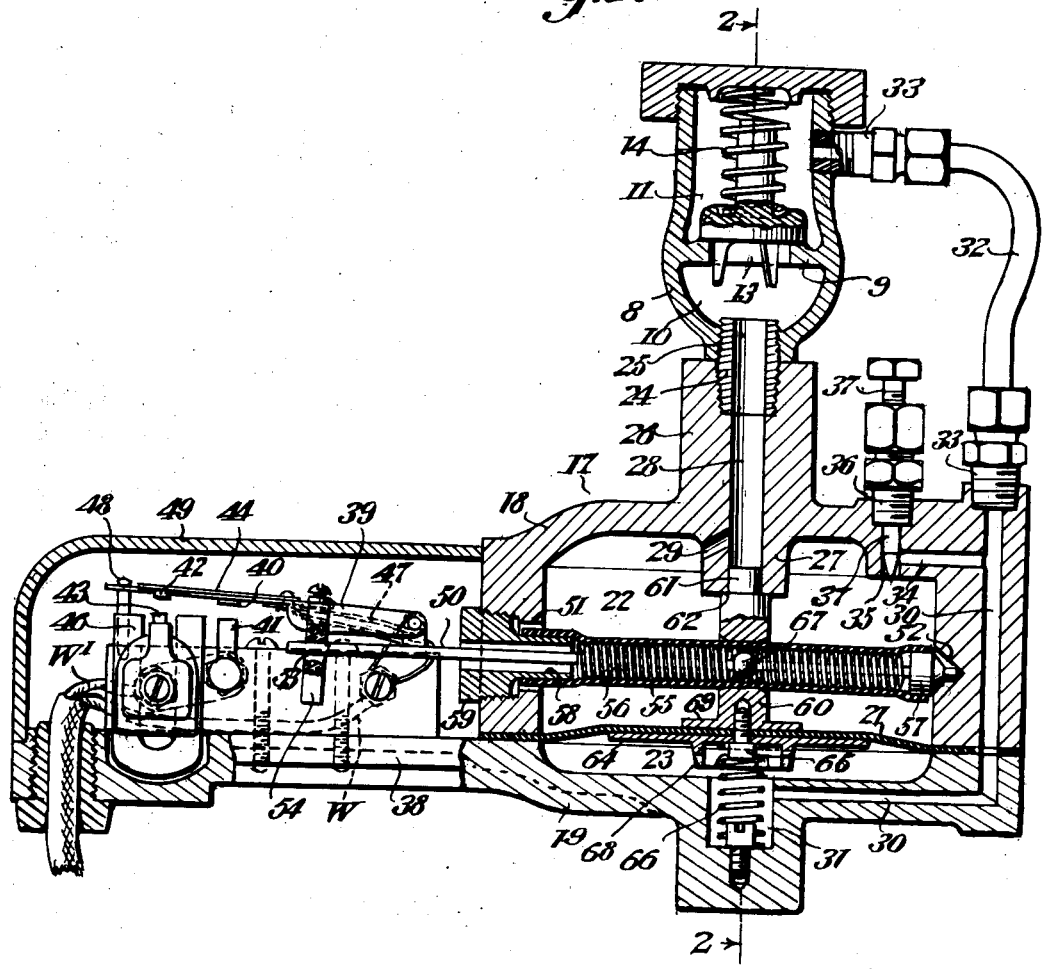

In the drawings, Fig. 1 is a diagrammatic elevation of a household water supply system equipped with the invention;

Fig. 2 a section on the line 2—2 of Fig. 3; and

Fig. 3 an enlarged section on the line 3—3 of Fig. 1.

The invention may be employed to particularly good advantage in connection with the water supply system of a penthouse on a tall building. Fig. 1 shows the invention embodied in such a system. It may be employed satisfactorily in many other services however. In the usual penthouse water system a supply conduit leads from a tank on the roof to utility outlets in the house such as basin, sink, and bath faucets, bath showers, toilet flushes, etc. Often the tank pressure is insufficient to produce the required flow at the utility outlets and more particularly at an outlet of large capacity, such as a shower or a toilet flush. Heretofore, in order to obtain the proper flow it has been customary to employ an elaborate auxiliary pressure system including an air pump, an air tank, a pressure regulator and gauge, a water pump, a considerable amount of piping and many valves. The present invention enables the required flow to be obtained automatically by a comparatively simple and inexpensive mechanism.

In Fig. 1 a tank representing the immediate water source for the penthouse is indicated at 1. A supply pipe 2 leads from the street main to the tank, and a delivery conduit or pipe 3 for supplying the penthouse leads from the tank and is connected to the utility outlets. In the present illustration there is an outlet of small capacity represented by a faucet 4, and an outlet of materially larger capacity represented by a bath shower 5. To simplify the illustration only two outlets are shown. Between the tank and the utility outlets a pump 6 is connected to the delivery conduit to accelerate the flow through the conduit when required. A rotary pump is indicated but a pump of any suitable type may be employed. An electric motor 7 is in driving connection with the pump. Between the tank and the pump there is tapped to the conduit 3 a fluid pressure responsive device to automatically control the operation of the motor 7 and the pump in accordance with the flow requirements at the utility outlets. This automatic device is a compact unit including a switch to open and close the circuit of the pump motor 7 and a mechanism to operate said switch automatically in response to fluid pressure changes in the conduit 3.

Said unit embodies a check valve device comprising a valve casing 8 divided by a partition 9 into chambers 10 and 11. The check valve 12 seats against the partition to close a port 13. A spring 14 tends to hold the valve seated. The valve casing has threaded pipe connections 15 and 16 at its opposite sides. A pipe section 3ᵃ of the delivery conduit, leading from the tank, is threaded into the pipe connection 15 of the valve casing to open into the chamber 10. A following pipe section 3ᵇ of the delivery conduit is threaded into the pipe connection 16 to lead from the chamber 11 to the pump inlet. The check valve forms a flow restriction in the delivery conduit for a purpose which will appear hereinafter.

A diaphragm device 17 is detachably joined to the check valve casing and includes a diaphragm casing formed of sections 18 and 19 bolted together as at 20. A diaphragm 21 is secured between the bolted casing sections and partitions the interior of the casing into chambers 22 and 23. Chamber 22 is materially larger than chamber 23. The diaphragm casing is joined to the check valve casing by a threaded close nipple 24. One end of the latter is screwed into a threaded aperture 25 in the check valve casing and its opposite end is screwed into a threaded bore in an external boss 26 on the casing section 18. Said casing section has also an internal boss 27 in alinement with the boss 26, and a bore 28 leads from the bore of the nipple through said bosses to the diaphragm chamber 22. A transverse branch bore 29 also leads from the bore 28 into the chamber 22 to complete a fluid connection between the check valve chamber 10 and the diaphragm chamber 22.

There is also a fluid connection between the check valve chamber 11 and the diaphragm chamber 23. A fluid passage 30 of small capacity leads through the walls of the diaphragm casing sections and through the bolted margin of the diaphragm. At one end said passage opens into a recess 31 in the casing section 19 and communicating with the diaphragm chamber 23. The opposite end of said passage is connected to the check valve chamber 11 through a tube 32. The ends of said tube are joined to threaded nipples 33, one screwed into the check valve casing to connect with chamber 11 and the other screwed into the diaphragm casing to connect with passage 30.

Between the diaphragm chambers 22 and 23 there is a restricted fluid leakage connection to equalize fluid pressure upon the opposite faces of the diaphragm. For this purpose there is a lateral branch passage 34 leading from the passage 30 through a wall of the casing section 18 and opening into a passage 35 in said casing section. A threaded nipple 36 is screwed into the casing section in alinement with the passage 35, and a needle valve 37 is screwed through the nipple. The latter has a stuffing box to prevent leakage past the valve. The valve is adjustable along the passage 35 across the adjacent end of passage 34 to vary the capacity of communication between said passages.

The diaphragm casing section 19 has a lateral arm 38 upon which an electric switch for the motor circuit is mounted. This switch is operated automatically by the diaphragm. In the present instance said switch is of a commercial type known as a "Penn" switch. It includes a pivoted switch arm 39 bearing a contact 40 and rockable to engage and disengage said contact with a fixed contact 41 to make and break the circuit of the motor 7. There are also auxiliary contacts 42 and 43. Contact 42 is borne by a leaf spring 44 on the switch arm, and contact 43 is fixed. Adjacent contact 43 there is a magnet 46 tending to swing the switch arm to circuit closing position. A spring 47 however, tends to hold the arm in circuit opening position and against a stop 48. One of the motor circuit wires W is electrically connected to the switch arm and through the latter to both of the contacts 40 and 42 on the arm, and the other wire $W^1$ is electrically connected to both fixed contacts 41 and 43. As the switch arm is rocked to closed position and approaches the magnet the latter accelerates the closure and first brings the contact 42 into engagement with contact 43 and then brings contact 40 into engagement with contact 41, the leaf spring 44 yielding to permit the latter engagement. Thus there is preliminary circuit closure through contacts 42 and 43 to prevent arcing between the main contacts 40 and 41 and consequent disintegration thereof. The switch mechanism is covered and protected by a hood 49 detachably secured to the casing arm 38.

Between the diaphragm and the switch arm there is an operative connection. The latter includes a lever 50 in the form of a straight rod. It extends across the diaphragm chamber 22 and outward through an aperture 51 in the side of the casing section 18 nearest the switch. At its inner end the rod is pointed and engaged in a recess 52 in the casing wall to fulcrum the rod. The outer end of the rod extends through a slot 53 in a depending insulation member 54 secured to the switch arm. Between the diaphragm and the lever there is a transverse push-and-pull connection to rock the lever.

A seal is provided to effectually prevent escape of fluid through the aperture 51 around the lever. Said seal includes a rubber tube 55 enclosing the lever within the chamber 22. Fitted within the rubber tube and encircling the lever is a closely coiled helical spring 56 forming a stiffening lining for the tube. The ends of the tube are sealed to exclude moisture. Adjacent its fulcrum the lever has a cylindrical enlargement 57 over which the adjacent end of the rubber tube is expanded and fitted. The opposite end of the tube is expanded and fitted over a nipple 58 extending inward through the aperture 51 and borne by a plug 59. The aperture is partly threaded and said plug has an enlarged threaded portion screwed into the aperture. The fluid pressure in chamber 22 surrounding the tube holds the ends of the tube pressed tightly around the nipple and around the lever enlargement. Thereby the aperture is sealed against escape of fluid from the chamber 22.

The operative connection between the diaphragm and the switch operating lever includes a yoke 60 extending between the diaphragm and the casing boss 27 and straddling the rubber tube 55. At the boss said yoke has a reduced guiding end 61 slidably fitted in the bore 28, and a stop shoulder 62. At its opposite end the yoke has a disk-like base 63 bearing against the diaphragm. A stiffening disk 64 bears against the opposite face of the diaphragm. Said disks are held clamped to the diaphragm by a screw 65. A spring 66 within the recess 31 and chamber 23 bears against disk 64 and tends to press the diaphragm toward the chamber 22. The internal diameter of the tube-lining spring 56 and also the bore of the plug 59 are materially larger than the lever to provide a required rocking clearance for the lever. At a point directly opposite the yoke 60 the lever has an enlargement bead 67 in the form of a small sphere fitting snugly within the spring 56. The yoke snugly fits the rubber tube and there is a positive push-and-pull connection between the diaphragm and the lever, through the yoke 60, the tube 55, the spring 56 and the bead 67. In the rocking of the lever by the shift of the diaphragm the rubber tube is flexed. Shift of the diaphragm in the direction of the chamber 22 is positively limited by engagement of the yoke shoulder 62 with the boss 27, and shift of the diaphragm in the opposite direction is positively limited by an abutment flange 68 on the diaphragm disk 64, said flange being engageable with the adjacent wall of the diaphragm casing.

The delivery conduit is preferably provided with a by-pass pipe 69 connected to the conduit at opposite sides of the check valve, and provided with a manually operable valve 70. Ordinarily there may be sufficient pressure in the tank to provide the desired flow at a utility outlet of small capacity. In that case it will be unnecessary to start the pump 6. The by-pass pipe 69 is of greater capacity than the ducts leading to the diaphragm chambers, and the small capacity outlet will be supplied through the by-pass without switch closing response of the diaphragm device and consequently without starting the motor. The by-pass valve 70 will be adjusted for proper service flow through the by-pass. In some installations the by-pass may be eliminated so that the diaphragm device will be responsive to the opening of any one of the utility outlets.

The automatic mechanism operates as follows: When there are no utility outlets open there is approximate pressure equalization all along the delivery conduit and consequently in the check valve chambers 10 and 11, and the check valve is held closed by its spring. Through passage 28 and port 29 the diaphragm chamber 22 is in communication with check valve chamber 10, and through tube 32 and passage 30, check valve chamber 11 is in communication with diaphragm chamber 23. Consequently there is equalization of fluid pressure on opposite sides of the diaphragm and the spring 66 holds the diaphragm in a position to dispose the lever 50 in switch-opening position. The motor and pump are then idle. It may be observed that pressure equalization on the diaphragm is assisted through the passages 34 and 35, past the needle valve 37. When one of the larger capacity utility outlets is opened a quick pressure drop occurs in the conduit 3, between the outlet and the check valve restriction. This causes a pressure drop in the diaphragm chamber 23 through the passage 30, tube 32 and check valve chamber 11. The flow from diaphragm chamber 22 through the passages 35 and 34 will be too restricted by the needle valve 37 to permit quick equalization of pressure at opposite sides of the diaphragm. Consequently since the diaphragm chamber 22 is connected to the high pressure reach of the conduit between the tank and the check valve restriction, through the passage 28 and port 29, the predominating pressure in said chamber will thrust the diaphragm toward the chamber 23 against the resistance of spring 66. This shift of the diaphragm causes the lever 50 to be rocked to operate the switch arm 39 to circuit closing position. This starts the motor 7 and the pump 6 is thereby operated to accelerate the flow through the conduit from the tank to the utility outlet. The check valve opens against the resistance of its spring 14 for flow from the tank to the outlet.

Closure of the utility outlet causes a quick build-up of pressure in the conduit 3, between the check valve restriction and the utility outlet. This pressure increase is transmitted to the diaphragm chamber 23 from the check valve chamber 11 through tube 32 and passage 30 and assists the spring 66 to shift the diaphragm back to normal position. Thereby the lever 50 is rocked to operate the switch arm 39 to open the motor circuit and stop the pump. The diaphragm device responds automatically and quickly to effect the starting of the pump when the service requires it, and to cut-off the power from the pump when need for pump operation ceases.

When there is leakage at a utility conduit it is desirable to prevent response of the diaphragm device thereto and thereby prevent undesired operation of the pump. The connected passages 30, 34 and 35 prevent such response. They permit restricted flow or leakage past the needle valve 37 and maintain equalization of pressure in both diaphragm chambers. The spring 66 then holds the diaphragm in normal position to keep the motor circuit open. By adjustment of the needle valve the responsiveness of the diaphragm device may be varied.

What I claim is:

1. A fluid pressure apparatus comprising a fluid chamber having a wall shiftable in response to pressure change in the chamber to operate a device located outside of the chamber, the chamber having an aperture in one side thereof, a lever fulcrumed at one end within the casing and extending thereacross transversely of the direction of shift of said wall and outward through said aperture and operatively connected to said outside device, a flexible rubber tube encircling said lever within the chamber and forming a seal to prevent passage of fluid through said aperture, a helical spring encircling the lever and fitted within the said tube to form a stiffening lining for it, and an operative connection between said shiftable wall and said tube to flex the latter and thereby rock the lever for operation of said outside device.

2. A fluid pressure apparatus comprising a fluid chamber, a diaphragm partitioning said chamber, the chamber having an aperture in one side, a lever extending across the chamber at one side of the diaphragm and outward through said aperture and operatively connected to a device outside of the chamber, a flexible tube encircling the lever within the chamber and forming a seal to prevent passage of fluid through said chamber aperture, a helical spring encircling the lever and fitted within said tube to form a stiffening lining for it, and an operative connection between the diaphragm and said tube to flex the tube as the diaphragm is shifted by fluid pressure change in the chamber and thereby rock the lever for operation of the outside device.

3. A unitary fluid pressure responsive device comprising a conduit union having a conduit flow restriction including a check valve, a casing joined to said union and defining a diaphragm chamber, a diaphragm partitioning said chamber, a fluid connection leading from said union at one side of said flow restriction to the diaphragm chamber space at one side of the diaphragm, a fluid connection leading from said union at the opposite side of the flow restriction to the diaphragm chamber space at the opposite side of the diaphragm for flexing the diaphragm in response to fluid pressure changes at one side of the flow restriction relatively to the fluid pressure at the opposite side of the restriction, a fluid pressure equalizing connection between the chamber spaces at opposite sides of the diaphragm more restricted than said first mentioned fluid connections, manually adjustable means to vary the capacity of said equalizing connection, an electric switch joined to said casing, an operative connection between the diaphragm and said switch to operate the latter by flexure of the diaphragm, and spring means tending to flex the diaphragm in one direction.

4. A fluid pressure responsive device comprising a conduit union having a conduit flow restriction, a casing defining a diaphragm chamber, a diaphragm partitioning said chamber, a fluid connection leading from said union at one side of said flow restriction to the diaphragm chamber space at one side of the diaphragm, a fluid connection leading from said union at the opposite side of the flow restriction to the diaphragm chamber space at the opposite side of the diaphragm for flexing the diaphragm in response to fluid pressure changes at one side of the flow restriction relatively to the fluid pressure at the opposite side of the restriction, a fluid pressure equalizing connection between the chamber spaces at opposite sides of the diaphragm more restricted than said first mentioned fluid connection, an electric switch, and an operative connection between the diaphragm and said switch to operate the latter by flexure of the diaphragm.

5. A fluid pressure responsive flow control mechanism comprising a flow restriction for a conduit, a shiftable fluid pressure responsive device, fluid connections leading from opposite sides of said flow restriction to said shiftable device to shift the latter in opposite directions in response to changes in fluid pressure at one side of the flow restriction relatively to the fluid pressure at the opposite side of the restriction, a control device operable to control the flow through the conduit, an operative connection between said shiftable fluid pressure responsive device and said control device to operate the latter to control the flow through the conduit automatically in response to said relative fluid pressure changes, and a fluid by-pass around said flow restriction.

6. A fluid pressure responsive flow control mechanism comprising a flow restriction for a conduit, a shiftable fluid pressure responsive device, fluid connections leading from opposite sides of said flow restriction to said shiftable device to shift the latter in opposite directions in response to changes in fluid pressure at one side of the flow restriction relatively to the fluid pressure at the opposite side of the restriction, a control device operable to control the flow through the conduit, an operative connection between said shiftable fluid pressure responsive device and said control device to operate the latter to control the flow through the conduit automatically in response to said relative fluid pressure changes, a fluid by-pass around said flow restriction, and adjustable means to vary the capacity of said by-pass.

7. A fluid pressure responsive device comprising a casing defining a fluid chamber, a diaphragm forming one wall of said chamber, the casing having a nipple projecting inward with respect to the chamber and defining an aperture in one side of the chamber, a lever fulcrumed within the chamber and extending thereacross and outward through said aperture for operative connection to an outside device, a flexible fluid-impervious sealing tube encircling said lever within the chamber and having one end fitted snugly around the periphery of said nipple and its opposite end sealed to prevent escape of fluid through said tube and said aperture, a helical spring encircling the lever and fitted within said tube to form a stiffening lining for it between the sealed end portions of the tube, and an operative connection between the diaphragm and said tube at an intermediate point of the latter to rock the lever when the diaphragm is flexed.

8. A fluid pressure responsive device comprising a casing defining a fluid chamber one wall of the chamber being shiftable in response to variations in fluid pressure within the chamber, the casing having a nipple projecting inward with respect to the chamber and defining an aperture in one side of the chamber, a lever fulcrumed within the chamber and extending thereacross and outward through said aperture for operative connection to an outside device, a flexible fluid-impervious sealing tube encircling said lever within the chamber and having one end fitted snugly around the periphery of said nipple and its opposite end sealed to prevent escape of fluid through said tube and said aperture, and an operative connection between said shiftable wall and said tube at an intermediate point of the latter to rock the lever when said wall is shifted.

9. In a fluid pressure mechanism including a casing defining a chamber and a member within the chamber shiftable in response to fluid pressure changes, the casing having an aperture at one side of the chamber and a recess across the chamber from said aperture, a sealed operating means for operating a device outside of the chamber by shift of said fluid pressure responsive member within the chamber and comprising a unit including a tubular member extending through said aperture and in sealed detachable connection with the casing around the aperture and forming an inwardly projecting nipple, a lever extending through said tubular member and across the chamber and having its inner end loosely fulcrumed in said recess and having an enlargement adjacent said end, a rubber tube surrounding the lever within the chamber and having its ends snugly fitted, one around the periphery of said nipple and the other around the periphery of said lever enlargement to seal the tube, and a helical spring forming a stiffening lining for the rubber tube between the sealing end portions of the tube, the fluid pressure responsive member being operable upon the rubber tube transversely of the latter at an intermediate point of the tube to flex the tube and shift the lever, and said assembled unit being withdrawable and insertable endwise through said aperture.

10. In a fluid pressure mechanism including a casing defining a chamber and a member within the chamber shiftable in response to fluid pressure changes, the casing having an aperture at one side of the chamber, sealed operating means for operating a device outside of the chamber by shift of said fluid pressure responsive member within the chamber and comprising a unit including a tubular member extending through said aperture and in sealed detachable connection with the casing around the aperture and forming an inwardly projecting nipple, a lever extending through said tubular member and into the chamber, and a flexible sealing tube surrounding the lever within the chamber and snugly fitted around the periphery of said nipple and around said lever to seal the tube, the fluid pressure responsive member being operable to shift the lever, and said assembled unit being withdrawable and insertable endwise through said aperture.

11. In a fluid pressure mechanism including a casing defining a chamber and a member within the chamber shiftable in response to fluid pressure changes, the casing having a screw threaded aperture at one side of the chamber and a recess across the chamber from said aperture, a sealed operating means for operating a device outside of the chamber by shift of said fluid pressure responsive member within the chamber and comprising a unit including a tubular screw threaded plug screwed into said aperture and forming an inwardly projecting nipple, a lever extending through said tubular plug and across the chamber and having its inner end loosely fulcrumed in said recess, and a flexible sealing tube surrounding the lever within the chamber and having its ends snugly fitted one around the periphery of said nipple and the other around said lever to seal the tube, the fluid pressure responsive member being operable upon the lever transversely of the latter at an intermediate point of the lever to rock the lever and flex the sealing tube, and said assembled unit being withdrawable and insertable endwise through said aperture.

12. In a fluid pressure mechanism including a casing defining a chamber and a member within the chamber shiftable in response to fluid pressure changes, the casing having an aperture at one side of the chamber and a recess across the chamber from said aperture, a sealed operating means for operating a device outside of the chamber by shift of said fluid pressure responsive member within the chamber and comprising a sealed unit including a tubular member extending through said aperture and in sealed detachable connection with the casing around the aperture and forming an inwardly projecting nipple, a lever extending through said tubular member and across the chamber and having its inner end loosely fulcrumed in said recess, a rubber tube surrounding the lever within the chamber and having its ends snugly fitted one around the periphery of said nipple and the other around said lever to seal the tube, and a helical spring forming a stiffening lining for the rubber tube between the sealing end portions of the tube, the fluid pressure responsive member being operable to rock the lever, and said assembled unit being withdrawable and insertable endwise through said aperture.

13. In a fluid pressure mechanism including a casing defining a chamber and a member within the chamber shiftable in response to fluid pressure changes, the casing having an aperture at one side of the chamber and a nipple at said aperture projecting inward with respect to the chamber, a sealed operating means for operating a device outside of the chamber by shift of said fluid pressure responsive member within the chamber and comprising a lever extending through said aperture and nipple and across the chamber and having its inner end fulcrumed, a rubber tube surrounding the lever within the chamber and having its ends sealed one around said nipple and the other around said lever to seal the tube, and a helical spring forming a stiffening lining for the rubber tube, the fluid pressure responsive member being operable upon the rubber tube transversely of the latter at an intermediate point of the tube to flex the tube and shift the lever.

ROBERT BRUCE HICKS.